March 29, 1966 E. A. BARTSCH 3,242,836
METHOD FOR MEASURING SEA SURFACE CONDITION
Filed April 8, 1963 4 Sheets-Sheet 1
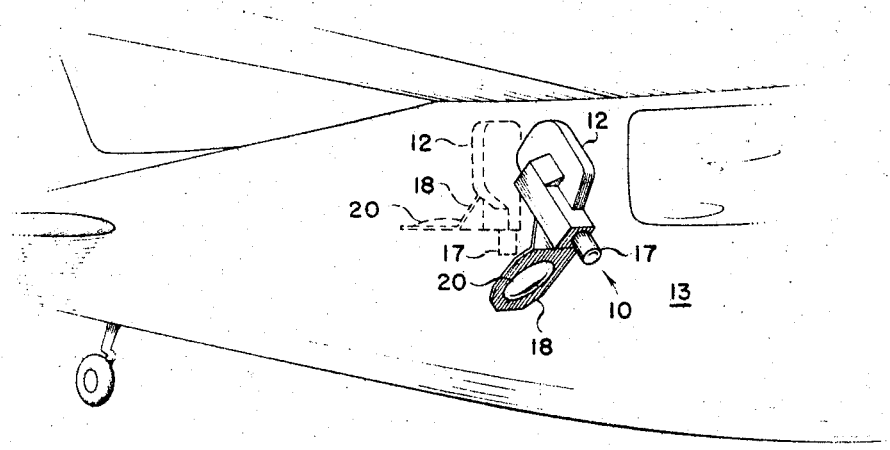
Fig. 1
Fig. 5
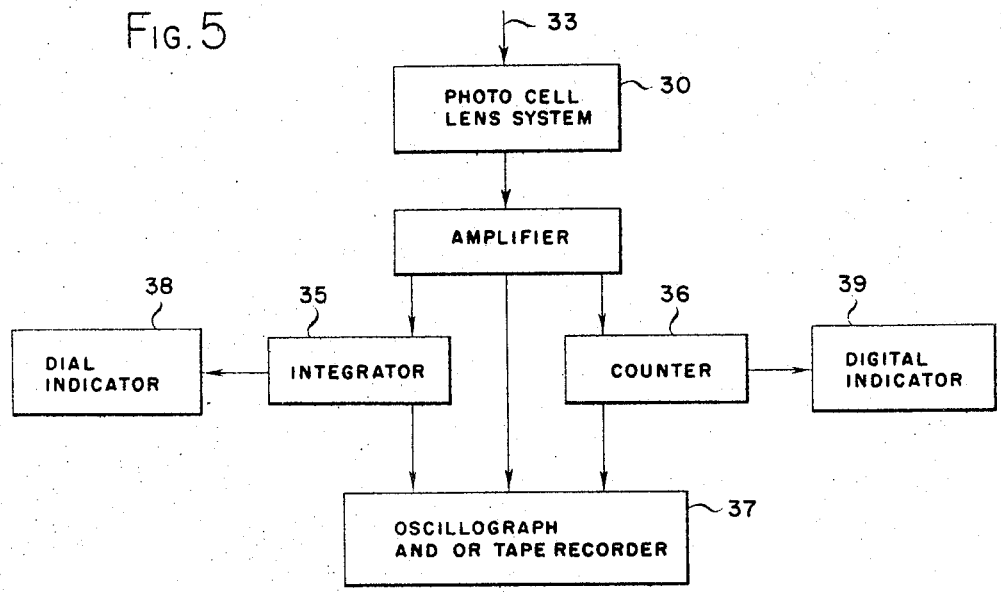
INVENTOR.
EDMUND A. BARTSCH
BY
Agent March 29, 1966   E. A. BARTSCH   3,242,836
METHOD FOR MEASURING SEA SURFACE CONDITION
Filed April 8, 1963   4 Sheets-Sheet 2
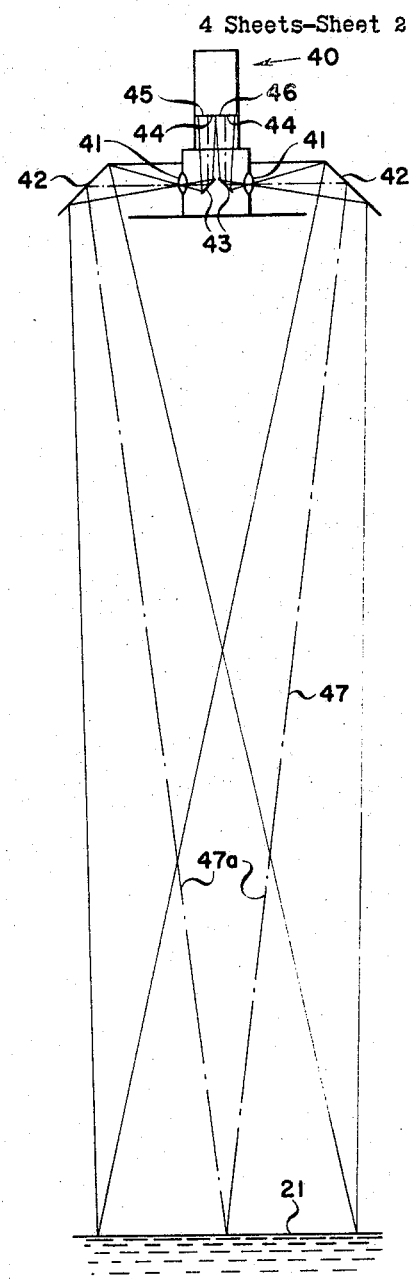
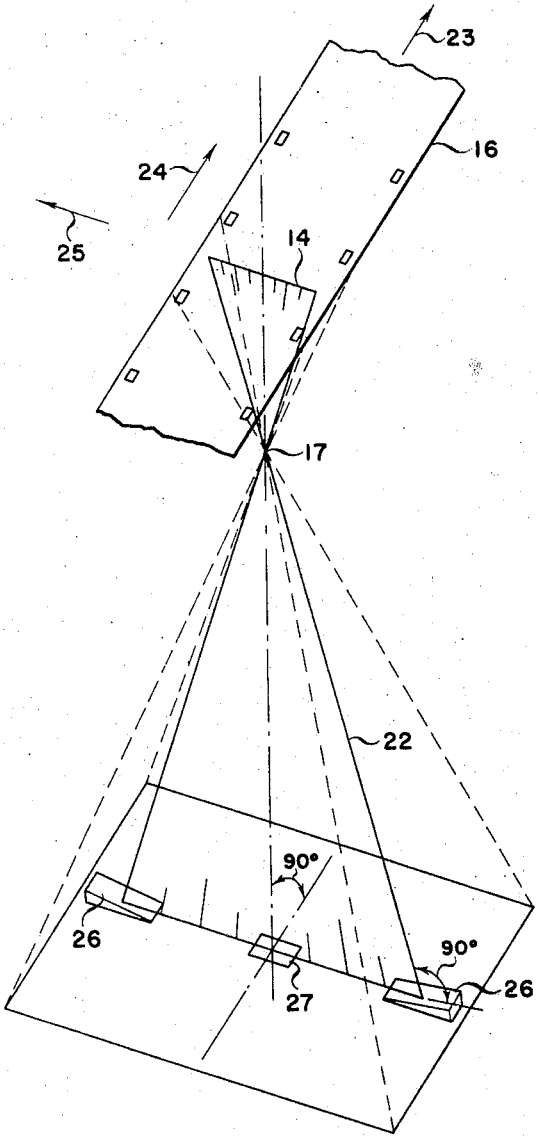
INVENTOR.
EDMUND A. BARTSCH
BY
Agent March 29, 1966      E. A. BARTSCH      3,242,836
METHOD FOR MEASURING SEA SURFACE CONDITION
Filed April 8, 1963      4 Sheets-Sheet 3
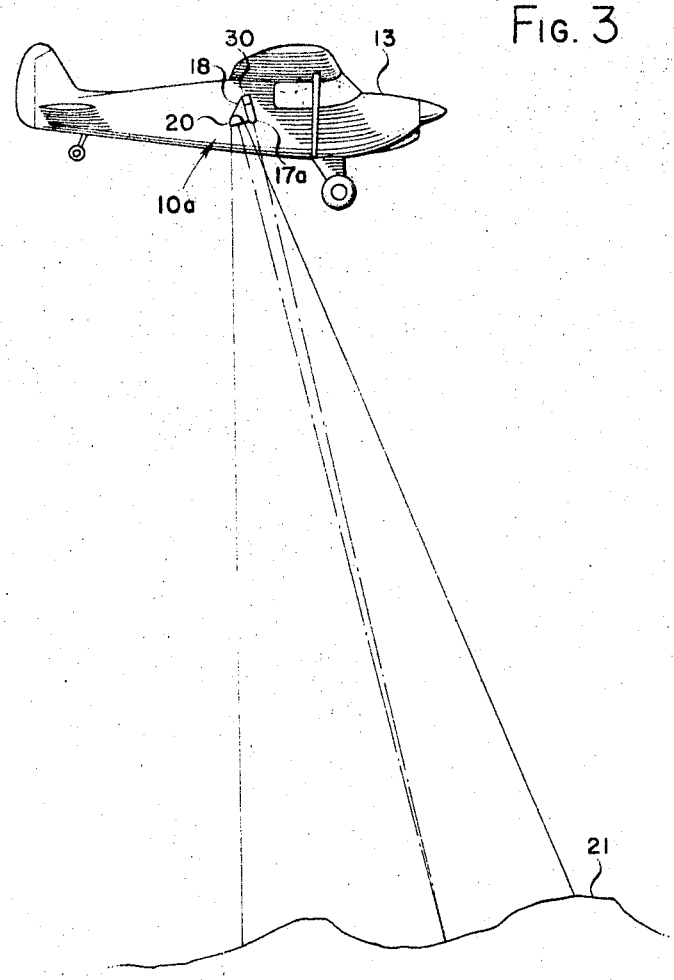
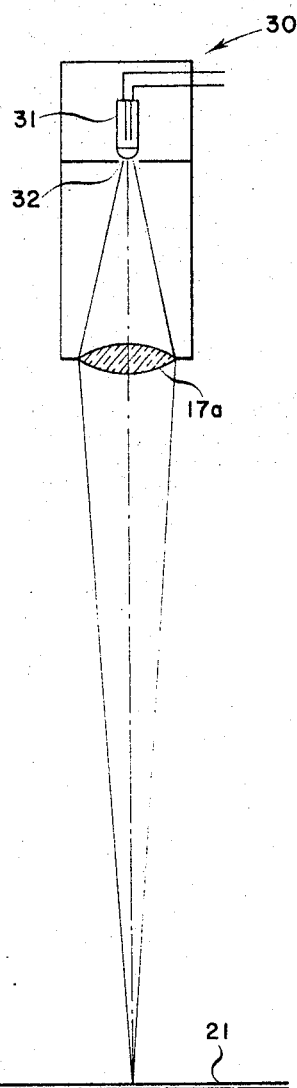
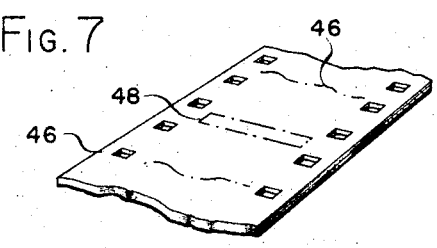
INVENTOR.
EDMUND A. BARTSCH
BY
Agent

3,242,836
METHOD FOR MEASURING SEA SURFACE CONDITION
Edmund A. Bartsch, Burbank, Calif., assignor to Lockheed Aircraft Corporation, Burbank, Calif.
Filed Apr. 8, 1963, Ser. No. 271,415
2 Claims. (Cl. 95—12.5)

This invention relates to a means and method for measuring sea surface condition and more particularly to a new process for securing a more accurate description of the roughness of the sea surface.

More specifically, this invention provides an improved method for optically measuring sea surface conditions. This has become a necessary resultant from an increasing demand for more definitive information regarding the surface roughness of the sea. The directional energy spectrum which is a function of wave heights and frequencies is of prime importance to those agencies responsible for the design of ground effect vehicles or hydrofoil ships. This invention provides an airborne photoelectric system for measuring and recording slopes of waves and their directional distribution, an airborne stereo slit camera for the measurement of wave height and wave length and an airborne slit camera for recording the time history of selected sea surface slopes. In addition, a simplified method for using the data is provided.

As hereinbefore stated, the demand for an adequate description of the roughness of the sea surface is increasing, the requirements being for more detailed information concerning the short waves of the sea surfaces. Some agencies are interested in the energy spectrum while others require details concerning the effect of surface roughness on reflection, diffraction, and scattering of light, radar, or sound waves. Surface wave lengths in the order of one half of the radar or sound wave lengths in the meter and centimeter band are of importance. These wave lengths require a high resolution capability of the wave recorder which can be obtained by the improved optical means and methods of this invention.

The frequency range of interest extends from 50 cycles per kilosecond to 20 c.p.s., or, in terms of wave lengths, from 2,000 feet to about one half inch. In the low frequency band ranging from 50 cycles per kilosecond to about 0.2 c.p.s., the gravity waves of high energy are important to those who design or operate ships. The frequency band of importance to those who design or operate ground effect vehicles or hydrofoil ships moves up to about 0.5 c.p.s., equivalent to 20 feet wave lengths. These two groups of interested persons require information concerning the directional energy spectrum which is a function of the wave heights and frequencies. A high frequency band up to 20 c.p.s., which includes the capillary waves and short gravity waves, or ripples, is of great importance to those who deal with radar or acoustic systems. This group requires knowledge of the directional distribution of slopes, their frequencies, and probabilities.

This invention provides an airborne photoelectric system for the measurement and recording of slopes of the water surface. The system of the invention further includes an integrator and a counter for the determination of the probability distribution in order to simplify the analysis. The recorder may be, for example, in the form of an oscillograph or tape recorder to store the information for a frequency analysis.

This invention provides resolution of the optical system which is so high that wave lengths down to about one half inch can be detected. No other system known so far has a comparable resolution capability. The photoelectric system of the invention allows the determination of the directional slope distribution and contains some information about the average wave length, but not sufficient for the frequency spectrum analysis.

Wave heights and directional distribution are obtained from a continuous record of the contour of the surface elevation taken with an airborne stereo slit camera, a modification of a camera having a single slit in the image plane and a pair of lenses. The principle of a stereo slit camera is that two pictures, necessary for a stereo representation, are being projected side by side onto the same film serving a pair of lenses, mirrors and prisms.

It is therefore an object of this invention to provide a new and improved means and method for optically measuring sea surface conditions.

Another object of this invention is to provide a new and improved means and apparatus in which the sea surface is more accurately measured and the results obtained are usable in connection with analysis thereof.

A further object of this invention is to provide a new and improved means and apparatus for measuring sea surface conditions in which analyzing instruments are airborne so as not to interfere with the water surface being analyzed.

Yet another object of this invention is to provide a new and improved means and method for optically measuring sea surface in which the instruments include an airborne recording slit camera and a narrow beam spotlight source which is mounted on a tiltable platform so as to be easily and readily adjusted.

Another object of this invention is to provide a new and improved means and method for optically measuring sea surface conditions which includes dial indicators or digital counters for monitoring the continuously varying integral and the number of electric pulses converted from the light pulses admitted by the photoelectric system of this invention.

A general object of this invention is to provide a new and improved means and method for optically measuring the sea surface conditions which improves over prior means and methods heretofore intended to accomplish generally similar purposes.

These and other objects of this invention will be more apparent from the following drawings, detailed description, and appended claims.

In the drawings:

FIGURE 1 is a perspective view of an airborne single-slit camera system of the invention showing a first operating position in solid lines and a second operating position in broken lines;

FIGURE 2 is an enlarged diagrammatic view showing the geometry of the slit camera of FIGURE 1;

FIGURE 3 is a diagrammatric side view of an airborne photoelectric system incorporated in this invention;

FIGURE 4 is a diagrammatic view of a photoelectric system of this invention;

FIGURE 5 is a block diagram of the photoelectric system of this invention;

FIGURE 6 is a diagrammatic view of a stereo slit camera used in conjunction with the system of this invention;

FIGURE 7 is an enlarged detail view of the film as related to an aperture (or slit) for recording reflected images thereto.

Figure 8:
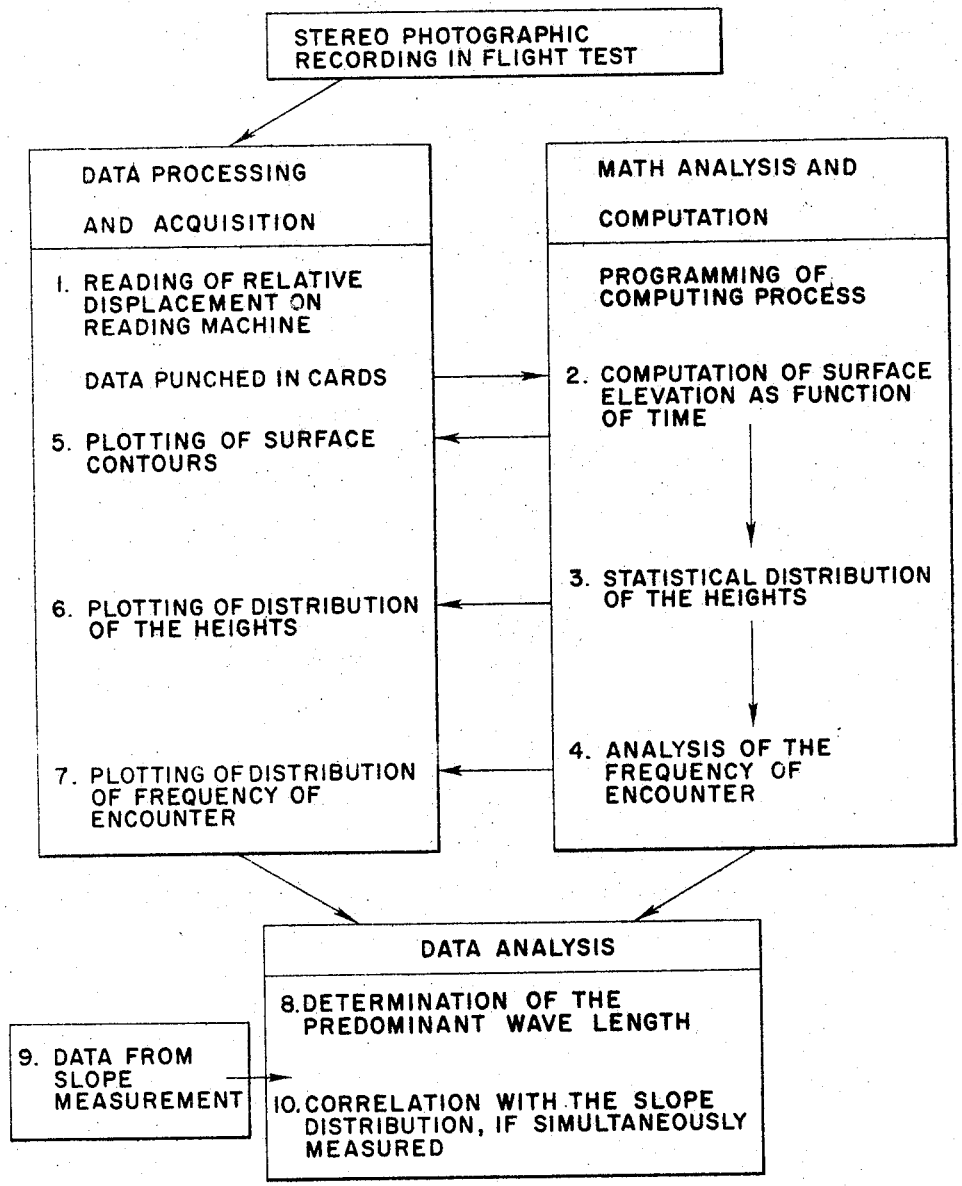
FIGURE 8 is a diagrammatic data flow diagram of the process of this invention.

Referring again to the drawings, and particularly to FIGURES 1 and 2, an airborne slit camera system for recording the time history of selected sea surface slopes, generally designated 10, includes a slit camera 12, carried by an aircraft 13. While a number of different types of cameras will manifest themselves, one found suitable for the first embodiment of the present invention is a 16 mm., highspeed motion picture camera of the type having a rotary prism and a rotating disk shutter immediately back of the prism which was modified by fixing the rotary prism and removing the rotating disk shutter. The conventional frame aperture of this camera was covered with a plate having a 0.002 in. slit across a film, shown diagrammatically at 14 and 16, respectively, in FIGURE 2. The exposure time of camera 12 can be varied between 0.1 and 0.5 millisecond and a 3 in. lens 17 covering a range of ±3° along slit 14 and 0.04° across slit 14 may be used. With this range, it is preferable to mount camera 12 on a tiltable bracket 18 which will tilt about its lateral axis from −5° to +30°. Camera 12 may be mounted on bracket 18 longitudinally, as shown in solid lines in FIGURE 1, wherein slit 14 is perpendicular to the flight path of aircraft 13 and film 16 moves along the flight path. Camera 12 may also be mounted on bracket 18 laterally as shown in broken lines in FIGURE 1, wherein slit 14 is parallel to the flight path of aircraft 13 and film 16 moves in a lateral direction perpendicular to the flight path. A light source 20 is also mounted on bracket 18 closely adjacent camera 12 and provides a continuous beam of light which illuminates the area being recorded on film 16. Of course it is obvious that the tiltable bracket may be replaced with a fixed bracket if a wide-angle lens is used on camera 12 and if a light source 20 having sufficient spread to illuminate the range covered by a wide-angle lens is employed. The beam of light preferably has a narrow spread in a lateral direction and is reflected from the surface of a body of water 21 as aircraft 13 flies thereover at a constant speed and altitude. The camera 12 intercepts only those rays of light reflected from a wave facet on the surface of the body of water 21 which is perpendicular to a line connecting lens 17 and the wave facet.

The slit 14 selects a distinct plane of interception of the reflected rays of light. Referring now to FIGURE 2, the plane of intercept 22 is fixed with respect to camera 12 and is determined by the camera axis, the slit 14 and the focal length of lens 17. The film 16 may move in the direction indicated by the arrow 23. Then, if the camera 12 is mounted in the position shown in solid lines in FIGURE 1, aircraft 13 should travel in the direction indicated by arrow 24. If, on the other hand, the camera 12 is mounted in the position shown in broken lines in FIGURE 1, aircraft 13 should travel in the direction indicated by the arrow 25. The water surface 21 is enclosed in a rectangle representing a full frame for the camera 12 and the plane 22 is picked out of this full frame by the slit 14. The angle of reflected light from the water surface 21 is known from the geometry of camera 12 and only those surface elements which are perpendicular to the light ray show up as a highlight on film 16. A surface element which is perpendicular to an angular limiting ray within the plane of intercept 22 is designated by the numeral 26 and a surface element which is perpendicular to the axis of camera 12 is indicated by the numeral 27. The surface elements 26 and 27 will show up as highlights at different positions on film 16. Therefore, the position of a highlight on film 16 is an indication of the angle of the surface element. The frequency of the highlights is a function of the speed of the airplane, the wave length and the direction of wave travel with respect to the course of the airplane. The film record, a time history of single slopes, is a visual record of the roughness of the sea surface. With respect to the broken line position of FIGURE 1, the inclination of the streaking lines across the film can be interpreted as the rate of change of the slopes.

The above described airborne instrument comprises features with several advantages. The airborne instrument carrier 13 does not interfere with the water surface since it has no direct physical contact with that surface. The recording time is relatively short because of the high speed of the movement of the carrier relative to the water surface.

It has been found that good film records are obtainable from a flight altitude of approximately 40 to 50 feet above the sea surface with an automotive spotlight 20 used as the light source having an intensity of approximately 30 watts. The choice of camera aperture, the slit width (preferably created by placing a mask having a relatively narrow slit transverse relative to the direction of the film motion) and the camera speed depend to some extent on the shortest wave length to be investigated. Filtered light and the use of color film allow the visual separation of the highlights caused by the two different light sources, i.e., the sun and the spotlight.

Referring now to FIGURES 3–5, a photoelectric system, referred to generally as 10a, includes a photocell-lens system 30 which is mounted on aircraft 13 on bracket 18 adjacent light source 20 in place of the camera 12. The light source emits light beams which are reflected from the water surface 21 and intercepted by the photocell-lens system 30. The lens 17a intercepts only those light rays reflected from a wave facet which is perpendicular to a line connecting lens 17a and the wave facet. Although the photocell-lens system is shown for purposes of illustration, but not of limitation, as having a single photocell 31 and a single aperture 32, it is apparent that a plurality of photocells may be mounted in a row for simultaneous recording through a wide angle. The aperture 32 is preferably adjustable from 0.002 inch to 0.01 inch. The photocell 31 receives highlights from water surface 21 giving wave slopes, as described above in connection with camera 12.

In accordance with the block diagram of FIGURE 5, the approach to a photoelectric counting system is shown in greater detail. The intercepted light rays 33 activate the photocell-lens system 30 for intervals of a very short duration. The photocell-lens system 30 converts the light pulses into electric pulses. After amplification, the electric pulses are integrated, as by an integrator 35, counted as by a counter 36 and recorded as by an oscillograph or tape recorder designated by the numeral 37. The integral and the number of pulses are also recorded.

The dial indicator 38 is preferably used for monitoring the continuously varying interval and the number of pulses. A visual digital indicator 39 is also provided. These instruments allow a quick estimate of the range of the slopes. Experience has shown that it is very difficult to estimate visually from an airplane, the range of slopes to be covered during a test. The proper selection of slope steps in the test program is extremely important for a good distribution function.

The integral of the highlights is a measure of the probability that the slope lies in a distinct interval. During tests with the photoelectric system, the recording slit camera 12 is preferably used simultaneously for comparison and reference. The oscillograph or tape record 37, containing the time histories of the pulses, the integral, and the accumulated number of the pulses can also be analyzed with respect to the frequency of encounter of the highlights. This is a function of the wave length, the speed of the airplane, and the direction of wave travel with respect to the course of the airplane.

The slope distribution, the result of a photoelectric recording method, can be correlated with results of measurements of atmospheric parameters aimed at better fundamental knowledge on the interaction between the atmosphere and the ocean. The analysis of the frequency of encounter gives some information about the predominant wave length. This information is of more use than the number of the sea state scale.

The directional probability of distribution of the slopes and of the average wave length are not sufficient for an adequate description of the directional energy spectrum. The information which concerns the surface elevation is obtained with the stereo slit camera generally designated by the numeral 40 in FIGURE 6.

The stereo slit camera 40 comprises pairs of lenses 41, mirrors 42 and prisms 43 which project a pair of images 44 of the same area observed under slightly different angles on the same image plane 45, side by side. The slit in the image plane crosses both optical axes and selects the plane of intercept. Only points lying within this plane are projected to the film 46 by both lenses. FIGURE 6 also shows the plane of intercept 47, as defined by lines 47a, which is perpendicular to the water surface and to the longitudinal axis of the airplane. The film 46, moving with a constant speed across the slit 48 (FIGURE 7) in the direction of the longitudinal axis of the airplane, records a continuous stereoscopic picture of the water surface.

Very low waves should be recorded from a distance of approximately forty feet to increase the reading accuracy. The best exposure time, dictated by the film speed and slit width is chosen according to the experience with the single slit camera. An artificial light source is not necessary if the water surface has sufficient contrast in the light and shade; however, a spotlight near the camera will accentuate the structure of the surface of the water. Therefore, two picture strips, taken at slightly different angles, can be correlated on the screen of the film reader. The relative displacement of corresponding image points along a line across the film is a function of the distance of the water surface from the camera.

The analysis of the stereo film record can be accomplished in the following steps, in reference to FIGURE 8:

(1) Reading of the relative displacement of two corresponding image points near the center line of the two film strips at constant time intervals. This will be done on a reading machine with the data punched on IBM cards (or the like).

(2) Computation of the surface elevation as a function of time including correction for the vertical motion of the airplane.

(3) Statistical analysis with respect to the distribution of the surface elevation.

(4) Frequency analysis. Directional spectrum.

(5) Plotting of the surface elevation as function of time on a plotting machine for visual presentation.

(6) Plotting of the distribution of wave heights.

(7) Plotting of the distribution of the frequency of encounter.

(8) Determination of the predominant wave length and direction.

(9) Data from slope measurement according to system of FIGURE 5.

(10) Correlation of the data from wave height measurement with the data from slope measurement.

The analysis will be based on the theory of a random moving surface and on the fundamentals of describing the confused sea in a moving coordinate system oriented with respect to the vessel.

The slope distribution obtained with the photoelectric recording system and the frequency spectrum of the wave length obtained from the stereo slit camera can be correlated analytically to obtain a complete picture of the directional spectrum of a sea surface.

In use, a camera 12 having a lens 17 with a three inch focal length was used which covered a range of plus or minus three degrees along the slit 14 and 0.04 degree across the slit. The light source 20 and the camera 12 were secured on the bracket 18 for tilting about the lateral axis from −5 degrees to +30 degrees.

First, in the longitudinal mounting depicted by the solid lines in FIGURE 1, the slit 14 was perpendicular to the flight path and the film moved along the flight path. The recorded slope, in direction of the flight path, equaled the tilt angle of the camera, whereas the lateral slope lay in the range of plus or minus three degrees. In order to obtain a two dimensional slope distribution, a separate record was taken for each tilt angle. A sample record was taken at 0 degree tilt angle, a second at five degrees and a third at ten degrees tilt angle. It was found that the number of highlights decreased with increasing tilt angle. The presence of short waves was indicated by the short distance between the single highlights and the longer waves by the groups of highlights.

In the second way of mounting the slit camera 12, shown in broken lines in FIGURE 1, wherein the camera is laterally mounted and the slit is oriented substantially parallel to the flight path, the film moves in a lateral direction, perpendicular to the flight path. When thus recorded, the highlights streaked across the film in a nearly constant angle which is a function of the film speed and the speed of the airplane. A slight variation of the crossing angle in this mounting is caused by the curvature of the reflecting facet, whether it is convex or concave. In this case a convex surface causes the highlights to cross the film under a smaller angle and a concave surface has the opposite effect. The variation of crossing angles is very small for short waves and larger for longer waves. The differences of the crossing angle may be interpreted as the rate of change of the slope. The average crossing angle can be used to determine the speed of the airplane relative to the water when the absolute distance between camera and surface is known. The length of the crossing lines can be interpreted as an indication of the long crestedness of the waves. Light rays stay longer in the plane of intercept when flying in the principal direction of the waves.

The light source used in both tests was a 600 watt aircraft landing light with a beam width of about 11 degrees. A film record shows that the character of the wave pattern is not uniform and produces areas with short waves and others with longer waves. The short waves produce very thin lines because of the very short exposure time whereas the longer waves record stronger lines.

Considerable saving in analysis time can be expected from a photoelectric system having a set of photocells in the image plane of the lens and an adjustable slit in front of the photocells. In such event the photocells are arranged in a row parallel to the plane of symmetry such that each photocell picks up one distinct slope. In this way, all slopes with the same heading can be picked up simultaneously. A single light source may be adjustably mounted, as described above, or a row of several light sources may be used.

The intercepted light rays activate a photocell for very short time intervals and the photocell converts the light pulses into electric pulses. After amplification, the pulses are integrated and recorded as outlined above. The integral and the number of pulses are also recorded on an oscillograph and/or a tape recorder. A tape is preferable for later frequency analysis.

Parallel to the recorder, a dial indicator, or counter, can be used for monitoring the integral or the number of pulses. These instruments are useful for a quick estimation of the range of slopes. Experience has shown that it is very difficult to estimate by eye the range of slopes to be covered during the test. The proper selection of slope increments in the test program is very important for a good distribution function.

The integral of the pulses is related to the probability of the slopes. The number of pulses is valuable information for determining the direction of wave travel or the principal axes of the slope distribution function. The frequency of the highlights is a function of the speed of the airplane, the wave length, and the direction of wave travel with respect to the course of the airplane. The analysis of the frequency of encounter yields information about the predominant wave length.

While the instant invention has been shown and described herein in what is considered to be the most practical and preferred embodiments, it is recognized that departures may be made therefrom within the scope of

What is claimed is:
1. A method for optically measuring sea surface conditions comprising the steps of:
   (a) reflecting light rays from the sea surface to be measured;
   (b) intercepting only those light rays which are reflected from a wave facet perpendicular to the intercepted light ray; and
   (c) recording said intercepted light rays to indicate the angle of said intercepted light rays on a film strip.
2. A method for optically measuring sea surface conditions comprising the steps of:
   (a) projecting a traveling light source onto said sea surface from a predetermined elevation, said light source traveling at a predetermined speed, whereby light rays will be reflected from said sea surface;
   (b) intercepting only those light rays which are reflected from a wave facet perpendicular thereto;
   (c) converting said intercepted light rays to electrical pulses;
   (d) amplifying said electrical pulses; and
   (e) counting said amplified pulses.

References Cited by the Examiner

UNITED STATES PATENTS

| | | | |
|---|---|---|---|
| 2,433,534 | 12/1947 | Sonne | 95—18 |
| 2,444,639 | 7/1948 | Elder | 88—24 |
| 2,736,250 | 2/1956 | Papritz | 95—18 |
| 2,929,305 | 3/1960 | Blackstone | 95—12.5 |
| 3,066,589 | 12/1962 | Beatty | 95—12.5 |
| 3,118,721 | 1/1964 | Exline | 346—14 |

FOREIGN PATENTS

| | | |
|---|---|---|
| 123,225 | 1/1947 | Australia. |

JOHN M. HORAN, *Primary Examiner.*